United States Patent Office 2,889,276
Patented June 2, 1959

2,889,276

VAPOR SPACE CORROSION INHIBITOR

Jack P. Barrett and Loyd W. Jones, Tulsa, Okla., assignors to Pan American Petroleum Corporation, a corporation of Delaware No Drawing. Application March 30, 1955
Serial No. 498,114

13 Claims. (Cl. 252—8.55)

This invention relates to inhibiting corrosion of ferrous metals exposed to vapors containing hydrogen sulfide and water vapor, and metals exposed both to vapors and liquids. More particularly it relates to inhibiting corrosion of oil well casing and tubing in zones exposed to corrosive vapors as well as zones exposed to corrosive liquids.

This is a continuation-in-part of our co-pending United States application S.N. 362,686, filed June 18, 1953, now abandoned. The parent application teaches the use of certain water-soluble aliphatic amines to inhibit corrosion of metals exposed to vapors containing hydrogen sulfide and water. Actually the corrosion which occurs is due to condensation of water from the vapors, usually in the form of small droplets, on the cool metal surfaces. This condensed water dissolves hydrogen sulfide as well as other gases such as carbon dioxide. The liquid water solution of hydrogen sulfide and other dissolved gases is the actual corrosive agent. It will be apparent that an inhibitor which is effective to decrease the corrosion due to such water solutions which form from the vapors will also be effective in reducing the corrosion caused by aqueous solutions of hydrogen sulfide at the bottom of a well and inside the tubing. The ultimate problem in both cases is to a certain extent the same. Nevertheless, the corrosion of ferrous metals exposed to corrosive vapors in the annular space between the tubing and casing in a well presents problems which are somewhat different from those offered by corrosion of ferrous metals by corrosive liquids at the bottom of the well or inside the tubing. For convenience, the corrosion of ferrous metals exposed to vapors from which water droplets containing hydrogen sulfide condense will hereafter be referred to, usually, as vapor phase corrosion. The corrosion of ferrous metals exposed predominantly to corrosive liquids such as those at the bottom of a well will generally be referred to as liquid phase corrosion.

The ability of the water-soluble aliphatic amines to inhibit both vapor phase and liquid phase corrosion has been explained above. Two principal problems arise, however, when an effort is made to use such amines for both purposes. First, the volatile amines evaporate rather quickly when poured into the annular space between the casing and tubing in a well. As a result, it is difficult to cause the desired amount of amines to reach the liquids at the bottoms of wells. The problem is particularly serious in wells which are very deep, which have high gas velocities in the casing or which have high bottom hole temperatures at which the vapor pressures of the amines are quite high.

Second, several liquid phase corrosion inhibitors are available which give even better protection than that provided by the water-soluble amines. Obviously, then, it would be desirable to use the water soluble amines to inhibit vapor space corrosion and some of the other inhibitors for the liquid phase corrosion. Unfortunately, many of the liquid phase corrosion inhibitors are not compatible with the water soluble amines and may destroy their effectiveness. For example, if formaldehyde is used as a liquid phase corrosion inhibitor it will react with the amines to form a product having very little amine vapor pressure. The effectiveness of the amines to inhibit vapor space corrosion is thus destroyed. On the other hand, the water soluble amines may adversely affect the liquid phase corrosion inhibitor. For example, some of the rosin amines used as liquid phase corrosion inhibitors seem to react with the lighter amines, or to polymerize in their presence, to form a solid mass of unknown properties which would be very difficult to introduce into a well.

A possible solution to the use of incompatible vapor phase and liquid phase corrosion inhibitors is to add them separately to a well on alternate days or perhaps with more than a day between use of the different inhibitors. Practical considerations of use in the field make such a procedure most undesirable. A single composition effective for both vapor phase and liquid phase corrosion inhibition would obviously be much more desirable.

Even if a compatible liquid phase corrosion inhibitor can be found the first problem of causing the water soluble amine to penetrate to greater depth in wells is still a problem. It will be apparent that the amine can be effective as a vapor phase inhibitor only to depths which it can reach before it evaporates. The parent application suggests dissolving the amine in solvents such as water or oil to decrease the vapor pressure. It is true that oils, for example petroleum fractions such as kerosene, do decrease the amine vapor pressure, but frequently not to the desired extent. Water, on the other hand, has been found to be too effective in most cases. That is, water solutions of the light amines do not release such amines from solution as rapidly as desired for many applications, particularly in the presence of large amounts of hydrogen sulfide. A vapor pressure depressant having an effect intermediate between that of oil and water is apparently needed.

With the above problems in mind an object of this invention is to provide a composition for inhibiting corrosion of ferrous metals exposed to vapors containing water and hydrogen sulfide. An additional object is to provide a composition capable of inhibiting both vapor phase and liquid phase corrosion by hydrogen sulfide. A more specific object is to provide an improved inhibitor composition for decreasing the hydrogen sulfide corrosion of ferrous metal surfaces exposed to corrosive vapors in the annular space between the tubing and casing in a well and also capable of reducing the corrosion of ferrous metal surfaces exposed to corrosive liquids in the bottom of the well and inside the tubing. An additional object is to provide improved means for causing volatile water-soluble amines to penetrate to a greater depth in the annular space of a well before evaporating and to evaporate more slowly to give extended periods of treating from batch injection.

As previously mentioned, the water-soluble aliphatic amines alone or in suitable solvents are effective inhibitors for both vapor phase and liquid phase corrosion and must be considered to be one means for accomplishing our objects.

A greatly improved oil-soluble composition is provided by combining the water-soluble aliphatic amines with certain higher molecular weight amines and fatty acids. The water-soluble amine may, for example, be diethylamine. The higher molecular weight amine may be octadecyl amine. The fatty acid may be the mixed acids derived from a normally liquid fraction of petroleum by liquid phase partial oxidation of the latter.

An even more highly desirable composition which is both oil-soluble and water-dispersible can be prepared by adding certain dispersing agents, preferably in the presence of a mutual solvent and an oil, to the combination of water soluble amine, higher molecular weight amine and fatty acid. This composition is unique in being oil-soluble, water-dispersible and in inhibiting both vapor phase and liquid phase corrosion.

Limitations exist on all the constituents of these compositions. These limits will be outlined below in more detail. In the discussions hereinafter the water soluble aliphatic amines will be referred to as "light amines" for purposes of convenience and brevity. The higher molecular weight amines will be referred to as "heavy amines" for the same reasons. These terms together with the other general terms "fatty acids," "dispersing agents," "mutual solvents" and "oils" are to be interpreted as used hereinafter to mean these general classes as limited by the following more detailed descriptions.

LIGHT AMINES

Certain limitations must be observed in selecting the light amine. It must, for example, be volatile to insure adequate evaporation and diffusion to the surface to be protected. Thus, they may be termed low-boiling amines. Amines having a maximum of about six carbon atoms per molecule should be used. All aliphatic monoamines tested containing from one to six carbon atoms have been found to be operable if they also meet the other requirements set forth herein. One requirement is that the amine should be non-cyclic. While many cyclic amines give high percentage inhibition, that is, the rate of loss of metal is greatly reduced, in general the corrosion which does occur is localized in a small percent of the total area exposed, often as little as one percent. As a result, a vicious type of local attack occurs which quickly penetrates ferrous metals at small spots while most of the metal surface remains uncorroded. The term "aliphatic," as employed herein, includes only open-chain compounds and is intended to exclude cyclic compounds such as the cyclo-aliphatics. The primary and secondary and tertiary symmetrical monoamines are preferred due to their high degree of effectiveness and their ready availability in large quantities at low cost. It will be understood that when the term "light amine" is employed hereinafter, the term can indicate a single amine falling within the described limits, or a mixture of suitable amines.

HEAVY AMINES

The heavy or high-boiling amine should contain at least about 10 carbon atoms per molecule. This not only insures against evaporation before the amine reaches the liquid phase in a well but also provides protection against a combination of oxygen and hydrogen sulfide corrosion which is not provided by acid complexes of lighter amines. An upper limit of about twenty carbon atoms per molecule should be observed because of the difficulty of dissolving in oil amines of higher molecular weight. Cyclic amines such as cyclohexyl amines having aliphatic side chains such as an octyl radical may be used. Heterocyclic amines such as 2 heptadecyl imidazoline may also be employed. The straight chain aliphatic amines such as octadecylamine are preferred, however, since they provide somewhat superior corrosion inhibition. The explanation may be that they pack together more closely on metal surfaces to provide more corrosion-resistant films. A class of amines which has been found to be particularly superior to others consists of polyamines having two or more amino groups located at one end of at least one long hydrocarbon chain. The preferred polyamine is obtainable under the trademark Duomeen-T. Other suitable fatty polyamines are obtainable under the trademarks Duomeen-S and Duomeen-C. In Duomeen-T the long hydrocarbon chain is derived from tallow acids, and hence, most of these chains are saturated. In Duomeen-S, on the other hand, most of the hydrocarbon chains are unsaturated since they are derived from soy bean oil acids. With Duomeen-C, the acids are derived from coconut oil and constitute a mixture of saturated and unsaturated acids. Most of the hydrocarbon chains in Duomeen-T and Duomeen-S contain from 16 to 18 carbon atoms. Since coconut oil is made up of acids having a wide range of molecular weights, the resulting amines have a correspondingly varied range of chain lengths, for example from about 8 to 18 carbon atoms. A hydrocarbon radical of at least 10 carbon atoms should be present. Such radicals insure the formation of a film of sufficient thickness on the metal to resist penetration even by combinations of corrosive materials such as oxygen and hydrogen sulfide. The straight chain aliphatic hydrocarbon radicals are very much preferred to insure closer packing of the molecules forming the film. However, other hydrocarbon radicals having at least about 10 carbon atoms are also effective to a smaller degree.

The polar portion of the amine should preferably contain at least two amino groups separated by from 2 to 4 carbon atoms. This portion may be heterocyclic in nature but preferably should be aliphatic since the salts of the non-cyclic aliphatic polyamines have surprisingly superior corrosion inhibiting abilities compared to salts of the cyclic polyamines.

So far as we have been able to determine, the aliphatic polyamines preferred in our invention may best be represented by the formula: RNXR'NHY. In this formula R is a hydrocarbon radical, preferably aliphatic, containing from about 10 to 20 carbon atoms, N is a nitrogen atom, X is a radical selected from the group consisting of R, H and R'NHY, R' is a hydrocarbon radical containing from 2 to 4 carbon atoms, H is a hydrogen atom and Y is a radical selected from the group consisting of H and R. The Duomeens are members of this class, having the simplified formula: RNHR'NH$_2$. The preferred amine is Duomeen-T having the formula:

$$R''NH(CH_2)_3NH_2$$

As previously noted, R'' in this formula is a mixture of aliphatic hydrocarbon radicals most of which contain from about 16 to 18 carbon atoms. 

FATTY ACIDS

The fatty acid should contain at least five and preferably at least six carbon atoms per molecule. The heavy amine complexes of acids containing only five or six carbon atoms give some protection but for best results the acid should contain about 10 or more carbon atoms per molecule. Acids containing less than five or six carbon atoms apparently fail due to high water solubilities. As in the case of the heavy amines, solubility considerations set an upper limit of about 20 on the number of carbon atoms in the acid molecule. The acid may contain aromatic, cyclic, ether, ester or hydroxyl groups and may be branched or unsaturated. We prefer to use, however, straight chain saturated unsubstituted acids to insure close spacing of the molecules in the protective film. Examples of suitable acids include stearic, palmitic, oleic, lauric, and the like obtained from vegetable and animal oils and fats. Mixtures of these acids may be used or mixtures of acids such as those produced in the formation of hydrocarbons by the reduction of carbon monoxide by hydrogen over a suitable catalyst. Individual members of these acid mixtures may, of course, be isolated and used alone if desired, but some of the mixtures are often preferable to avoid emulsion and gel formation difficulties incurred when some of the purer forms of individual acids or acid mixtures are used. A mixture of acids which is preferred because the amine complexes do not tend to form emulsions or gels is a mixture produced from normally liquid fractions of petroleum such as kerosene by liquid phase partial oxidation in a process such as that described in U.S. Patent 1,690,769, Burwell. The acids may be purified but we have found that the impurities such as alcohols, ketones, esters and the like appear to exert desirable demulsifying and degelling action and for that reason should be retained. These acids can be obtained under the trademark Alox 425.

Another suitable class of fatty acids consists of certain carboxylic residues from the treatment of vegetable oils, animal oils, or acids derived from such oils. Amine salts of acids in such residues have a very desirable decreased emulsion-forming tendency as well as increased water dispersibility.

The preferred acid residue is that produced by distilling, at about 270° C. under about 4 mm. of mercury pressure, the by-product acids obtained in the preparation of sebacic acid by fusing castor oil with alkali. Production of this residue is described in more detail in U.S. Patent 2,267,269, Cheetham et al.

In the manufacture of sebacic acid from castor oil, the oil is heated with a caustic alkali. This splits the oil, forming octanol-2, methyl hexyl ketone, the alkali salt of sebacic acid, and the alkali salts of various other long-chained acids. The alcohol and ketone are readily removed from the reaction mixture by distillation. The alkali salts which remain may then be dissolved in water, and, upon slight acidification of the resulting solution, an oily layer separates. At a pH of about 6, the aqueous phase contains the alkali salt of sebacic acid, while the oily layer contains various other acids from the reaction. The term "by-product acids" is generally applied to the mixture of acids forming the oily layer.

These by-product acids may then be separated into two parts. After these acids have been washed with a dilute mineral acid, such as sulfuric or hydrochloric, they may be washed with water and dried. They may then be distilled under reduced pressure. Fatty acids which are primarily monobasic carboxylic acids may be taken off at 100° C. to 270° C. at pressures as low at 4 mm. This treatment leaves a residue which is a mixture of fatty acids, apparently primarily polybasic in character. It is this residue which we prefer to employ in forming corrosion inhibitors with amine salts. The residue is commercially available under the trademark VR-1.

Other carboxylic acid residues are known which contain highly oxidized fatty acids at least some of which are polybasic in nature. Most of these residues also contain alcohols, esters, and other oxygenated hydrocarbon materials. They also generally contain a mixture of acids having a range of molecular weights. So far as is known these other acid residues also produce amine salts having at least some decreased emulsion-forming tendencies, improved water dispersibility and increased corrosion inhibiting ability. Examples of such acid residues are those produced by the propane extraction of animal and vegetable fats, oils and fatty acids. The process is well described and illustrated in Industrial and Engineering Chemistry, February 1949, page 280. One such acid residue can be obtained under the trademark Ebony Fat. This is the residue remaining from propane extraction of fats mostly of animal origin. Another specific acid residue is obtainable under the trademark Tallene. This is a residue from propane extraction of tall oil. Others are mentioned in the Industrial and Engineering Chemistry article and still others will occur to those skilled in the art.

The term "carboxylic acid residue" is intended herein to include all residues from the treatment of animal or vegetable fats, oils or fatty acids derived from them, in which the residues contain highly oxidized polybasic acids containing at least about 12 carbon atoms per acid radical. The term "highly oxidized" is intended to indicate that the acid molecule contains more oxygen than that present in the acid radical.

DISPERSING AGENTS

Operable dispersing agents belong to the class of water-soluble nonionic ester-free ethers of an alcohol and a polyglycol. All members of even this limited family are not operable, however. The alcohol portion should contain at least 12 carbon atoms if it is to provide sufficient oil solubility in this portion of the molecule to form the most effective dispersing agents. The alcohol preferably should contain no more than about twenty carbon atoms since a larger number results in decreased oil solubility. The alcohol may be either of two principal types. One type consists of the straight chain aliphatic alcohols such as lauryl and oleyl alcohol. The second type consists of alkylated phenols such as nonyl phenol, dinonyl phenol, octyl naphthol or the like. Whether the straight chain aliphatic alcohols or alkylated phenols are employed, the polyglycol portion of the dispersing agent should contain between about 20 and about 40 oxyethylene groups for best results. The two types of water-soluble nonionic ester-free ethers may be conveniently described as consisting of materials having the formula HOW. In this formula H is a hydrocarbon radical containing from about 12 to 20 carbon atoms, and W is a polyglycol radical containing from about 20 to about 40 oxyethylene groups. Preferably the dispersing agent should have the formula H'OW in which H' is an alkylated aromatic hydrocarbon radical containing from about 12 to 20 carbon atoms and is attached to the oxygen linkage through the aromatic group.

The preferred dispersing agent is prepared by oxyethylating nonyl phenol bottoms; the residue remaining upon distillation of crude nonyl phenol. This material is believed to be principally dinonyl phenol, but it contains considerable quantities of other phenols as well as some inert materials. Due to the uncertain composition it is difficult to specify a number of oxyethylene groups per molecule of alkylated phenol. It has been found that nonyl phenol bottoms reacted with from 2 to 4 times their weight of ethylene oxide form operable dispersing agents. The optimum weight ratio of nonyl phenol bottoms to ethylene oxide is about 1:3.

OILS

When the term "oil" is used herein it should be interpreted to mean petroleum oil. The oil preferred for most purposes is a refined petroleum fraction such as kerosene or refined mineral oil. The principal advantage of using such a refined product is to avoid the effects of impurities in crude oils. Most petroleum crude oils, however, are completely satisfactory for our purposes.

MUTUAL SOLVENTS

The real problem in selecting a mutual solvent is to find one which is a solvent for both the oil and the dispersing agent. It has been found, however, that a simpler rule to follow is to select a mutual solvent for oil and water. The dispersing agent, being highly water soluble, is also soluble in these mutual solvents for water and oil. Preferably, the mutual solvent should be miscible in all proportions, or nearly so, with both oil and water. Suitable mutual solvents include materials such as ethers, ketones, esters and alcohols. As specific examples of the aforesaid classes of mutual solvents, there may be mentioned acetone, methyl acetate, p-dioxane, the 2-alkoxy-ethanols sold under the trademark "Cellosolves" and the lower molecular weight alcohols such as methanol, ethanol and isopropyl alcohol, said alcohols representing the preferred class of mutual solvents which may be employed in carrying out my invention. In this connection, 1-butanol has been successfully employed but is not sufficiently water soluble to produce dispersions as stable as those formed by use of the alcohols having three or less carbon atoms per molecule. The mutual solvent performs several functions. First, it aids in forming a homogeneous mixture of the water soluble dispersing agent, the oil and the oily inhibitor. Second, it aids in the dispersion of the inhibitor into the water contacting the surface to be protected. Third, the mutual solvent reduces the viscosity, gel strength and pour point of the corrosion inhibiting composition, thus facilitating handling of this composition. Methanol is a preferred mutual solvent which is easily obtained in almost anhydrous condition.

Three principal compositions can be prepared employing the described ingredients. In order of increasing complexities they are as follows: First, the light amine alone or in a solvent such as oil or water may be used as a simple inhibiting composition. Second, an oil-soluble combination of the light amine, the heavy amine and the fatty acid may be employed with advantage. Third, the oil soluble combination may be converted into an oil-soluble water-dispersible form by use of certain dispersing agents, preferably in combination with a mutual solvent, an oil and water. The three compositions will now be described in more detail together with their various advantages and the treating procedures and concentrations recommended for each.

SIMPLE INHIBITING COMPOSITION

The simplest inhibiting composition is the light amine or a solution of this amine in a solvent such as oil or water. If this simplest composition is used the concentration of the amine in liquid water condensing on metal surfaces or otherwise in contact with metal should be from about 50 to about 500 p. p. m. To establish such concentrations in water condensing in pipelines, it is suggested that as much as about one or two pounds of the amine (about one quart) should be introduced into the line per million cubic feet of gas measured at pipeline conditions. For less severe corrosive conditions as little as 1/10 the suggested amount may be used. The amine may be added continuously or intermittently in liquid or vapor form either undiluted or diluted by solvents such as water or oil. If water drains are set in the line at low spots, the concentration of amine in the water can be measured. The amount of amine added to gas in the line can then be regulated to give the desired concentration in the condensed water. If water drains are not available the gas itself can be analyzed. A suggested analytical method consists of the following steps. First, the gas is forced through a fritted glass bubble tube and into about 20 ml. of water. After 15 to 20 minutes of bubbling, the bubble tube is removed from the water and about 5 ml. of glacial acetic acid and 5 ml. of a bromphenol blue solution are mixed in. The resulting solution is then shaken vigorously with about 20 ml. of chloroform. A yellow color in the lower chloroform layer indicates the presence of amine in the gas. This simple test is sensitive to as little as about 0.1 or 0.2 mg. of amine per cubic ft. of gas. We have found that fair inhibition of corrosion by condensed water in the presence of hydrogen sulfide occurs when even less than this concentration of amine is present in the gas.

If the amine is to be used in tanks the desired concentration can usually be established in water droplets condensing on the underneath surface of the roof or on the inner walls of the tank by introducing into the vapors about one or two pounds of amine daily per million cubic feet of vapor space.

This may be increased to as much as about 10 pounds per million cubic feet of vapor space for extreme conditions of active use or may be as low as 1/10 pound or less per million cubic feet per day for tanks employed in static storage. It is best to start with larger quantities and gradually decrease the quantity of amine added until the presence of the amine can just barely be detected by the method suggested above. Since the period of the cycle of heating and cooling is normally 24 hours, the inhibitor should be added daily to the tank. It may be added in the form of liquid or vapor, diluted or undiluted. Preferably, however, it should be poured into open top containers such as one or more shallow pans disposed in the vapor space of the tank.

The method of applying the invention to wells depends to some extent on whether gas is flowing up the annular space between the casing and tubing. If gas is flowing it may be desirable to introduce the amine through a "macaroni string" with an open end at or slightly below the lowest level at which corrosion is occurring. If introduced by such means, the amine may be liquid or vapor and may be diluted or undiluted. The introduction may be intermittent or continuous. The preferred means of introducing the amine into a well, whether gas is flowing or not, is to pour into the annular space of the well a solution of the amine in a relatively non-volatile solvent such as oil, water, alcohol, or the like. The solution may contain from about 1 or 2 percent up to as much as 50 percent of the amine. A convenient concentration is about 25 percent. In this connection, all percentages relating to solutions of the light amine are in percent by volume. The lower limit of 1 or 2 percent is imposed to insure an appreciable vapor pressure of the amine over the solution. The upper limit is imposed to obtain the effects of dilution, which include extending the period of treatment by decreasing the rate of evaporation of the amine and increasing the depth to which the amine flows down the well before evaporating.

The concentration delivered to the well usually is not the concentration which flows down the annular space. This is because the inhibitor is generally added to the annular space through a lubricator to flush the inhibitor into the well and down the casing.

The amount of amine employed in wells where gas is flowing through the annular space should usually be considerably more than amounts used in pipelines. Larger amounts are required due to the greater water condensation rates and higher hydrogen sulfide concentration in wells. As much as 5 or 10 pounds of amine per million cubic feet of gas at well pressure should be introduced unless experience indicates smaller amounts to be suitable. Generally, about 1 or 2 pounds of amine per million cubic feet of gas are more than sufficient. It will be noted that the solvents used with most compositions added to wells will reduce the vapor pressure of the amine to below that normally present in a pipeline, where the use of solvents is not so advantageous. However, the reduced vapor pressure is somewhat compensated for by the extended time of treatment due to the action of the solvent. Also, in most wells the rate of flow of gas is much slower than in pipelines. Thus, much longer periods of exposure of the metal surface to gases containing amines are afforded. If the rate of flow of gas is slow, introduction of about ½ pint of amine dissolved in a gallon or more of oil, if repeated once a day, will usually be much more than adequate. If the casing is shut in, as little as 1 pint of amine per week may be sufficient. If the gas flow is fairly rapid, daily treatment with as much as 3 or 4 quarts of amine dissolved in about 10 or more gallons of oil may be advisable, in extreme cases. Daily addition of the inhibitor is recommended but in many cases, such as where little flow of gas is present, the amine, or preferably its solution, may be added only once a week or at even less frequent intervals. The quantity of amine added over a given period of time should remain about the same, regardless of the frequency of addition. That is, the size of batch added once a week, for example, should be about seven times the size added once a day.

Preferably, treatment should begin with heavy rates of use as high as 50 times as great as the expected final rate. The initial rate is normally 10 to 20 times the expected final steady rate. These large volumes at the beginning serve to build up the concentration of light amine in the vapors. This, in turn, tends to establish quickly an equilibrium concentration in water condensed on metal surfaces. The treatment volume and frequency can then be decreased slowly until the desired concentration of amine can be detected in the gas at all times or at a suitable time after the inhibitor has been introduced. For example, if inhibitor is added weekly, the amine should be detectable for at least 24 to 48 hours after the treatment, by the test suggested above, if adequate protection of exposed metals is to be achieved.

OIL-SOLUBLE COMBINATION

It has been found that the water-soluble amines are perfectly compatible with the salts of the higher molecular weight amines and fatty acids. These materials can be combined to form an oil-soluble inhibitor combination effective for both vapor phase and liquid phase corrosion. The salt of the higher amine and fatty acid is a very loosely bound material. The substance is most commonly referred to as a complex to distinguish it from the true salts. Hereinafter the term complex will be employed with reference to the reaction product of the heavy amine and fatty acid. The light amine might be expected to displace the heavy amines from this complex with the fatty acids. This reaction apparently proceeds to a considerable extent since the vapor pressure of the light amine is reduced by the presence of the heavy amine complex with the fatty acids. For example, the vapor pressure of diethylamine over its solution in kerosene was found to be twice as great as the vapor pressure of the same concentration of amine in kerosene containing the complex of Duomeen–T and Alox 425. The temperature of the solution containing the complex could be raised more than 30° F. before the vapor pressure of the diethylamine reached the same value as that over the solution in kerosene in the absence of the complex. It will be apparent, therefore, that the presence of the complex in oil solutions of light amines will have several very desirable effects. First, it will cause the light amine to reach greater depths of wells before evaporating from solutions. This is particularly true of wells having elevated bottom-hole temperatures. Second, the slower rate of evaporation will mean that a batch of solution will introduce the volatile amine into a gas stream over a longer period of time.

The corrosion inhibiting ability of the complex is known to depend on the presence of both the heavy amine and fatty acid. Therefore, there was some concern regarding the effects of the reaction of the light amine with the fatty acid. As reported in more detail hereinafter, tests have shown, surprisingly, that in spite of this reaction, and in spite of the lower inhibiting ability of the light amines, up to about half of the higher amine complex with fatty acids can be replaced by the light amine with little if any loss in inhibiting ability. In fact, some tests seem to indicate a slightly improved effectiveness due to the presence of the light amine.

The description to this point has been directed to hydrogen sulfide corrosion. It has also been discovered that the combination of inhibitors is effective in decreasing the corrosion of ferrous metals by oxygen and by combinations of oxygen and hydrogen sulfide in the presence of water whether the metal is exposed to vapors or liquids.

The principal application of the oil-soluble combination of inhibitors is to oil wells. In this application little of the light amine may reach the liquids in the bottom of the well. It is advisable, therefore, to employ a ratio of heavy amine to fatty acids which is most effective in the absence of the light amine. Preferably, this ratio should be such that one carboxylic acid radical is provided for each amino nitrogen atom whether mono- or poly-amines or mono- or poly-carboxylic acids are employed, and whether the amine is primary, secondary or tertiary. If desired, however, either the amine or the acid may be employed in an excess up to about 100 percent over that necessary to react with the other. Particularly if it is desired to hold some of the light amine tightly to insure penetration to greater depths in higher temperature wells against an upward flow of gas, it will be advisable to provide an excess of fatty acid with which some of the light amine can react at least temporarily.

The ratio of light amine to the complex of heavy amine and fatty acid can vary within fairly wide limits while still retaining the advantages of the combination. If an effective amount of the light amine is to be released in the vapor space the combination should contain at least about 10 percent by weight of the light amine. This is also about as little as can be employed to decrease effectively the viscosity and pour point of the complex by the dilution and solvent action of the light amine. Not more than about 80 percent by weight of the light amine should be employed if the complex is to be present in sufficient amount to be highly effective. In addition, the vapor pressure reducing effects of the complex on the light amine become rather small if less than about 20 percent of the combination consists of the complex, a suitable solvent, or both.

The preferred ratio of complex to light amine is about two to one since the average well requires about twice as much as the complex to treat the liquid phase as it requires of the light amine to treat the vapor phase.

The light amine serves as a diluent for the complex and the complex acts to depress the vapor pressure of the light amine. It is generally desirable, however, to employ a solvent or diluent such as kerosene to adjust the physical properties of the combination and to depress further the vapor pressure of the light amine. If the diluent is to have appreciable effect it should amount to at least about 10 percent by weight of the solution. An upper limit of about 80 percent and preferably not over 70 percent is imposed by the economic undesirability of handling a large amount of diluent containing little active inhibitor. In addition, it has been found that the salt of the light amine and heavy acid tends to separate from solution when the quantity of kerosene exceeds about 70 percent. A very desirable oil-soluble combination consists of about 40 percent by weight of a diluent such as kerosene, about 40 percent of a complex of an aliphatic amine such as Duomeen-T and a fatty acid such as Alox 425 and about 20 percent of a light amine such as diethylamine. Diluents other than kerosene can, of course, be used with advantage. These may include, for example, alcohols such as methanol or isopropanol, ethers such as dioxane or dipropyl ether, esters such as ethyl acetate or ketones such as acetone. Some diluents such as carbon tetrachloride, carbon bisulfide, benzene, or the like may be employed to enhance the ability of the combination to prevent deposition of paraffin or to remove paraffin already deposited in the exposed formation or in the casing or tubing.

Use of the oil soluble combination in wells to inhibit corrosion and deposition of paraffin have been mentioned. In addition, the combination may be used in wells for other purposes such as to reduce emulsion forming tendencies in some wells, to clear water from water block formations penetrated by the well, and to deposit lubricating films of the heavy amine and fatty acid to decrease rod wear. Other applications will occur to those skilled in the art.

While the oil soluble combination is applicable as a corrosion inhibitor principally to wells, it is also applicable to pipelines, tanks, and refinery equipment under many conditions. For example, it has been found desirable to use film-forming inhibitors such as a complex of higher amines and fatty acids in fractionating columns, heat exchangers, condensers, and the like. Generally, an alkaline material such as ammonia is also employed to neutralize acids which may be present. The oil soluble combination of the light amine with the complex of higher amine and fatty acid not only provides inhibitors for surfaces exposed to both the liquid and vapor phases but the light amine also acts as the desired alkaline material.

Amounts of the oil soluble combination employed in a given length of time will vary somewhat with conditions. For most wells a convenient treating scheme is to add about two gallons per week of the preferred oil soluble combination. The entire volume may be added once a week or it may be added daily at a rate of about one quart per day. For wells having low production and mild corrosive conditions the treating rate may be reduced to as little as a quart a week, the treating frequencies possibly being reduced to once a month, so that about a gallon of inhibitor is introduced in a single batch every month. For severe corrosive conditions in wells producing large volumes of fluids the rate may be increased to as much as 20 to 30 quarts per day. In extreme cases even more may be added.

Preferably, treatment should begin with heavy rates of use as high as 50 times as great as the expected final rate. The initial rate is normally 10 to 20 times the expected final steady rate. This high rate at the beginning serves to build up the concentration of light amine in the vapor space and to form a good film of the heavy amine and fatty acid on surfaces exposed to liquids. The initial high rate may be continued for as much as several months but usually is employed for a week or two. The initial high rate of treatment is sometimes followed by treatments at an intermediate rate for approximately the same length of time before the final low steady rate is begun.

The inhibitor is normally added to a well by introducing it into the space between the casing and tubing. The well production is then frequently circulated into this space to wash the inhibitor down the casing with as much as several barrels of crude oil and brine. To avoid washing too much of the light amine down the well, the flush should be limited to 20 or 30 gallons. If a packer is employed in the bottom of a well between the tubing and casing the inhibitor may be introduced into the tubing and allowed to fall down the tubing to the bottom of the well. It will frequently be necessary to unseat the pump and force the inhibitor down the tubing by pumping oil down after it. The inhibitor may also be introduced into the equipment to be protected by spraying it into the vapor space. When using this technique the light amine acts in some cases as a volatile dispersant to provide a much more finely divided spray of the liquid portions of the inhibitor composition. This spray technique is particularly valuable in applying the inhibitor to the vapor spaces of tanks, to pipelines, and to refinery equipment.

The inhibitor may also be used in stick form with a suitable binder or it may be introduced in soluble or fusible capsules such as gelatin capsules. It may also be introduced at the bottom of a well, for example from a container with an orifice to regulate the rate of escape of the inhibitor.

WATER DISPERSIBLE FORM

In general, the water-dispersible form of inhibitor is prepared from the oil-soluble composition by use of the means disclosed in more detail and claimed broadly in U.S. patent application 335,161, filed by Loyd W. Jones on February 4, 1953. It will be apparent, however, that the highly polar light amine will have certain ionic and solvent effects which must be taken into account in preparing a water-dispersible form of the combination of the light amine and complex. In 335,161, Jones, five ingredients are suggested, four being essential and one being optional. Essential ingredients include the oil-soluble inhibitor, a dispersing agent, an oil and a mutual solvent for the inhibitor and dispersing agent. The optional ingredient is water. We have found that diethylamine or its substitute performs, to a certain extent, the functions of the oil and mutual solvent. Thus, the water-dispersible combination may consist only of the light amine, the complex of a heavy amine and a fatty acid, and the dispersing agent. For best stability of both the combination and of its dispersion in water, however, the oil, water and mutual solvent should also be present. All compositions tested which fall within the following limits have been found to be operable.

| | Percent by weight |
|---|---|
| Light amine | 10 to 30 |
| Heavy amine complex of fatty acid | 10 to 75 |
| Dispersing agent | 5 to 30 |
| Oil | 0 to 75 |
| Mutual solvent | 0 to 10 |
| Water | 0 to 10 |

A preferred composition has the following formula:

| | Percent by weight |
|---|---|
| Diethyl amine | 18 |
| Neutral complex of Duomeen-T and Alox 425 | 36 |
| Nonyl phenol bottoms reacted with 3 times the weight of ethylene oxide | 10 |
| Kerosene | 31 |
| Methyl alcohol | 2 |
| Water | 3 |

The advantages of using the light amine with the complex of heavy amine and fatty acid are much the same in the water dispersible form as in the oil soluble form. That is, the complex controls the vapor pressure and evaporation rate of the light amine while the amine exerts a desirable solvent action on the complex to improve its physical characteristics such as viscosity and pour point. The reduction in pour point is particularly valuable, the additional solvent action of the amine serving to reduce the pour point to a temperature below zero degree Fahrenheit.

One precaution should be noted when using the water-dispersible combination in wells. This concerns mixing the water dispersible form with water at the well head or flushing the water dispersible form down the well with water. When a water solution of the light amine contacts gases containing hydrogen sulfide the hydrogen sulfide is absorbed into the water and reacts with the amine to form the sulfide salt. The salt is in equilibrium with its hydrolysis products, the free amine and the hydrogen sulfide. Therefore, there is a small vapor pressure of amine over a water solution of the sulfide salt of the amine. However, the vapor pressure of amine may be lower than desired for well treating.

It has been found that when a water solution of the light amine is introduced into a well the diffusion of hydrogen sulfide into the water, where it reacts with the amine, occurs at such a slow rate that the amine evaporates into the vapor space and establishes the desired concentration there before a serious degree of reaction with hydrogen sulfide takes place. Nevertheless, it is advisable in introducing any of the compositions containing the light amine into a well to use as little water as possible. The principal problem occurs, of course, when the water dispersible form of combination inhibitor is used in a well producing mostly water. When the inhibitor is flushed down the well by returning well production into the casing only a limited amount of flush should be employed to avoid excessive dilution of the inhibitor and to afford as little water surface as possible into which hydrogen sulfide can diffuse.

Our invention will be better understood from consideration of the following examples:

Example I

To determine the effectiveness of various volatile amines as inhibitors for corrosion of ferrous metals by water containing hydrogen sulfide, the following tests were made. Measured quantities of the amines to be tested were added to one liter Florence flasks each containing 50 ml. of kerosene. The flasks were filled with de-aerated water containing 5 percent sodium chloride, and known concentrations of hydrogen sulfide. Tared mild steel test panels, 1 inch by 1 inch by 1/16 inch, suspended on glass hooks were then lowered into the water phases in the flasks. After sealing, the flasks were allowed to stand quiescent for seven days at a room temperature of about 80° F. The panels were then removed from the flasks, dipped in dilute inhibited hydrochloric acid solution, rubbed lightly to remove adhering scale, if any, rinsed in distilled water, dried and weighed. They were also visually examined to determine if localized corrosion had occurred. The results are presented in Table I. The amount of amine in every case was 200 parts per million by volume of total liquids.

TABLE I

| Amine | P.p.m. $H_2S$ | Loss of metal, mg. Control | Loss of metal, mg. Inhibited | Percent Inhibition | Remarks |
|---|---|---|---|---|---|
| Methyl | 600 | 24.8 | 3.8 | 84 | Uniform protection. |
| Dimethyl | 600 | 27.0 | 6.6 | 76 | No local attack. |
| Trimethyl | 600 | 27.0 | 6.7 | 75 | Do. |
| Ethyl | 600 | 27.0 | 4.7 | 83 | Do. |
| Diethyl | 850 | 30.5 | 3.6 | 88 | Uniform protection. |
| Triethyl | 600 | 24.8 | 2.3 | 91 | No local attack. |
| Propyl | 600 | 24.8 | 4.2 | 84 | Do. |
| Dipropyl | 600 | 24.8 | 3.4 | 86 | Do. |
| Isopropyl | 600 | 27.0 | 9.0 | 67 | Do. |
| Diisopropyl | 600 | 27.0 | 5.6 | 79 | Do. |
| 1-Butyl | 850 | 30.5 | 9.8 | 68 | Uniform etching. |
| Methyl, n-propyl | 600 | 24.8 | 2.2 | 91 | No local attack. |
| Pyrrolidine | 740 | 23.6 | 4.0 | 83 | Slight local attack. |
| Pyrroline | 850 | 30.5 | 8.0 | 74 | Pitting. |
| Piperidine | 850 | 30.5 | 4.4 | 86 | Severe pitting |
| Piperazine | 850 | 30.5 | 5.2 | 83 | Severe local attack. |
| Ethylenamine | 850 | 30.5 | 6.2 | 80 | Very severe local attack. |

It will be noted that the non-cyclic aliphatic monoamines permitted no local attack, while all the cyclic amines allowed rapid corrosion in very small scattered spots (pitting) or rapid corrosion in one or more small areas (local attack). Several of the aliphatic non-cyclic monoamines did not provide perfectly uniform protection over the entire area, but the more highly corroded areas in all cases covered at least about 25 percent of the total metal area. Thus, the corrosion was distributed over a sufficiently broad area to prevent rapid penetration of the metal. The brine in several of the tests contained sufficient oxygen to cause a slight precipitate of elementary sulfur. Since the volatile amines tested were operable as inhibitors in these brines, it is apparent that the amines have considerable tolerance for oxygen even in the presence of hydrogen sulfide. This is of considerable importance in applications such as tanks where some air is usually present.

*Example II*

To determine the ability of the amines to vaporize from a solution, diffuse through vapors, and dissolve in condensed water to inhibit corrosion by such water, the following test was conducted. Two 3.5 liter battery jars, fitted with gas-tight lids, were set up with necessary gas and liquid inlets and outlets. Round holes were cut through the lids and clamping screws placed to hold round 1⅛ inch diameter mild steel test panels over the holes. The test panels were pressed down against rubber O-rings to provide gas-tight seals.

Each jar was thoroughly swept out with air-free nitrogen first and then with air-free nitrogen containing 400 parts per million $H_2S$ by volume. Two hundred milliliters of water were placed in the jars and one was treated with 0.7 ml. of diethylamine. The jars were then sealed.

The whole assembly was kept in a constant temperature box. The bottoms of the jars were gently heated so that a temperature differential existed from the bottom to the top to provide vaporization and condensation of moisture and inhibitor.

Every 24 hours the water, inhibitor, and gas in each jar were replaced with a fresh supply. A test panel was removed from each jar every day for seven days. The panels were cleaned as described in Example I, weighed, and visually examined. The results are presented in Table II.

TABLE II.—Panel Weight Loss, Milligrams

| Days Exposed | Control | Diethylamine | Percent Inhibition |
|---|---|---|---|
| 1 | 1.1 | 1.1 | 00.0 |
| 2 | 1.9 | .7 | 63.2 |
| 3 | 4.8 | .7 | 85.5 |
| 4 | 7.4 | .5 | 93.3 |
| 5 | 7.5 | .8 | 89.4 |
| 6 | 8.9 | 1.8 | 79.8 |
| 7 | 11.2 | 1.2 | 93.4 |

The results were somewhat erratic, as would probably be expected from the nature of the test, but the inhibiting action of the amine is apparent. The panels from the jar containing diethylamine all showed uniform protection, no evidence of localized corrosion being visible.

*Example III*

To determine the vapor pressure of the light amine over various liquids, about 100 ml. of the liquid were placed in a 4 liter jar with a sealed top through which a dropping funnel and tubes to a sample bulb and to a pump were sealed. The tube from the pump dipped below the liquid surface in the jar. The pump intake was connected to the vapor space in the jar through the sampling bulb. A natural gas supply was also connected to both the pump intake and outlet. The technique consisted of the following steps. The water or kerosene was placed in the jar and about 4 or 5 cubic feet of natural gas were allowed to flow through the jar. The sampling tube was also flushed out with gas. The natural gas supply was closed off and the pump intake to the sampling bulb was opened. The desired amount of diethyl amine was dripped through the vapor space into the liquid in the jar by means of the dropping funnel, and the vapors of natural gas and amine were circulated for several hours to establish equilibrium between the liquid and vapor phases. The sample bulb was next closed off and three separate batches of water were introduced into it to dissolve the amine. This amine was titrated with 0.01 N sulfuric acid using methyl red indicator and the amount of amine in the vapors was calculated. Results are presented in Table III.

TABLE III

| Liquid in Cell | Temp., ° F. | Grams of Amine [1] per cu. ft. Vapors |
|---|---|---|
| 25% Amine [1] in Water | 94 | 8.4 |
| 25% Amine in Kerosene | 93 | 8.3 |
| 12.5% Amine in Water | 97 | 2.9 |
| 12.5% Amine in Kerosene | 95 | 6.0 |
| 12.5% Amine and 19% Complex [2] in Kerosene | 94 | 3.1 |
| 12.5% Amine and 19% Complex in Kerosene | 125 | 6.0 |

[1] The light amine was diethylamine.
[2] The complex was obtained by neutralizing Alox 425 acids with Duomeen-T.

The similarity of vapor pressure of the diethylamine over 25 percent solutions in kerosene or water is a coincidence which is obviously not true for 12.5 percent solutions. Apparently the depressed vapor pressure of 12.5 percent water solutions is due to a hydration effect very similar to that which occurs when ammonia is dissolved in water. The unexpectedly high vapor pressure over kerosene is probably due to solubility effects, diethylamine and kerosene apparently not being completely miscible in all proportions, but nearly so. The ability of the complex to depress the light amine vapor pressure is apparent from the data. It will also be noted that the presence of the complex makes possible increasing the temperature of the solution by 30° F. before the vapor pressure of the light amine reaches the same value it had in the absence of the complex.

*Example IV*

A test was run by substantially the same procedure as in Example III to determine the effects of the presence of hydrogen sulfide on the vapor pressure of diethylamine over solutions in kerosene and water. The only difference in the procedure consisted of passing a stream of natural gas containing about 12.5 percent hydrogen sulfide through the jar after the system had been flushed with natural gas and the amine had been introduced. This gas was not circulated, but was vented from the system through the sample bulb, carrying some amine with it. The rate of flow of gas was about ½ to 1 cubic foot per hour. An initial sample of gas was taken a few minutes after introduction of the hydrogen sulfide. Other samples were taken at intervals of 2 hours. The results are presented in Table IV.

TABLE IV

| Liquid in Cell | Temp., °F. | Grams of Amine per cu. ft. Vapors | Remarks |
| --- | --- | --- | --- |
| 12.5% Amine and 10% Complex in Kerosene. | 95 | 1.8 | Initial. |
|  | 95 | 0.8 | 2 hrs. |
|  | 95 | 0.0 | 4 hrs. |
| 12.5% Amine in Water | 95 | 0.0 | Initial. |
|  | 95 | 0.0 | 2 hrs. |

From the data in Table IV, it will be apparent that the solution of diethylamine in kerosene and the complex continued to release vapors of the light amine into the vapors over a period of at least two hours in spite of the rather rapid flow of gases through the cell and in spite of the presence of the hydrogen sulfide. The water solution, on the other hand, failed to release detectable amounts of the amine into the vapors after only a few minutes contact with the gases containing hydrogen sulfide. It should be noted in this connection that the lower limit of detectability of diethylamine in the procedure employed was about 0.2 gram per cubic foot of vapors. The presence of amine in the vapors was easily detectable initially by use of pH sensitive indicator paper.

*Example V*

To determine the corrosion inhibiting abilities of the oil-soluble combination of a light amine and a complex of heavy amine and fatty acid, as well as the water-dispersible form, tests were carried out by the same procedure described in Example I. The results are presented in Table V. The concentration of inhibitor in every case was 100 p.p.m. and the concentration of hydrogen sulfide in the water was about 600 p.p.m. The light amine employed in every case was diethylamine used in 100 percent concentration. The complex was obtained by neutralizing Alox 425 acids with Duomeen-T and was used in the 50 percent concentration in kerosene employed in general field practice. The water-dispersible complex was also employed in 50 percent by volume field strength and was made up by mixing 4 pounds of the undiluted complex, 2.57 pounds of kerosene, 0.57 pound of isopropanol and 0.26 pound of a dispersing agent prepared by reacting one mole of lauryl alcohol with 23 mols of ethylene oxide.

TABLE V

| Inhibitor | Loss of Metal, mg. | | Percent Inhibition |
| --- | --- | --- | --- |
|  | Control | Inhibited |  |
| Light Amine | 0.0195 | 0.0047 | 76 |
| Complex | 0.0195 | 0.0022 | 89 |
| Water-dispersible Complex | 0.0195 | 0.0018 | 91 |
| 50-50 Combination of Light Amine and Complex | 0.0195 | 0.0016 | 92 |
| 25-75 Combination of Light Amine and Complex | 0.0195 | 0.0020 | 90 |
| 50-50 Combination of Light Amine and Water-dispersible Complex | 0.0195 | 0.0020 | 90 |

From the data in Table V it will be apparent that the combinations of light amine with the complex in either the oil-soluble or water-dispersible form has inhibiting ability substantially equivalent to that of the complex without the light amine. That is, substitution of the light amine for a part of the complex does not harm the inhibiting ability. This is in spite of the lower inhibiting ability of the light amine when used alone. The inhibiting ability of the complex even seems to be improved slightly by the light amine in the oil-soluble form of the combination, thus demonstrating a slight combination inhibiting effect.

*Example VI*

To determine further the effects of hydrogen sulfide on the volatility of the light amine, a test was set up as follows. The test specimens were 6-inch nipples of 1-inch steel pipe suspended in rubber stoppers through holes in the lid of a glass jar having a capacity of about 3 gallons. The lower ends of the nipples were sealed by rubber stoppers. Each specimen was cooled by circulating cool water (about 50° F.) through a test tube inserted into the pipe. The entire test apparatus was kept in a constant temperature box at 110° F. The relatively cold temperature of the nipples caused a heavy condensation of water on them from water vapor in the air which, in turn, came from the water below. Duplicate test jars were set up, one containing an inhibitor and one being a control test without inhibitor. The tests were carried out as follows. First, the weighed sand blasted nipples were mounted through the lid and the lid sealed on the jar. Then air was removed by purging with nitrogen. Next, one liter of water containing 5 percent sodium chloride and 600 p.p.m. of $H_2S$ was introduced into the control jar. In the test jar, the water also contained 1420 p.p.m. of diethylamine. Finally, after exposure for six weeks, the nipples were removed, cleaned, reweighed and inspected. The average weight lost by the control nipples was 135.0 milligrams. The protected nipples lost, on the average, only 22.6 milligrams. Thus, the inhibition was about 83 percent complete.

Oil field brines rarely contain more than 600 p.p.m. of hydrogen sulfide. Therefore, it is apparent that a water solution of diethylamine containing as little as 1420 p.p.m. (0.142 percent) amine will release sufficient amine into the vapors in most wells to protect exposed metal surfaces from corrosion by water, containing hydrogen sulfide, condensing from the vapors. The required vaporization takes place even though more than enough hydrogen sulfide is present in the water to react with all the amine, assuming that two amine molecules will react with one hydrogen sulfide molecule. The rate of water condensation was much higher than usual for most wells since the temperature differential was quite large over the very short vapor distance between the liquid water and the cool metal surface. Therefore, it can be concluded that the test conditions are much more severe than would be present in most wells.

Example VII

Additional tests were run as described in Example VI, except that the concentrations of inhibitor and hydrogen sulfide were varied. These tests were run for only 24 hours and the test nipples were visually inspected. The results are presented in Table VI.

TABLE VI

| Parts Per Million in Treating Water | | Results |
|---|---|---|
| DEA [1] | $H_2S$ | |
| 100 | 600 | Failed. |
| 200 | 600 | Do. |
| 400 | 680 | Do. |
| 800 | 680 | Do. |
| 1,200 | 680 | Partial protection. |
| 1,500 | 680 | Good protection. |
| 2,000 | 600 | Excellent protection. |
| 1,000 | 1,300 | Failed. |
| 2,000 | Saturated (1,800 p.p.m.) | Do. |

[1] DEA is diethylamine.

These data seem to indicate that under the test conditions, the concentration of light amine should be at least about twice as great as that of hydrogen sulfide in the brine if good protection is to be provided for metal surfaces exposed to condensing water vapors. Actually the relationship is probably much more complex and probably depends on the mass action effect of the hydrogen sulfide to decrease the dissociation of the amine sulfide and amine acid sulfide into their component parts. The vapor pressure of the amine thus probably also depends on the concentration of amine sulfide present, temperature of solution, presence or absence of the complex of heavy amine and fatty acid and the like.

Example VIII

The test described in Example VII was repeated, except that the complex of Duomeen-T and Alox 425 was added. The complex was added in the water-dispersible form, one series of tests being made using a formula containing about 3.00 pounds of the neutral complex of Duomeen-T and Alox 425, about 0.75 pound of diethylamine, about 0.36 pound of isopropanol, about 0.20 pound of the reaction product of one mole of lauryl alcohol and 23 moles of ethylene oxide, about 2.72 pounds of kerosene, and about 0.05 pound of water. This formula contains about 10 percent diethylamine and will be referred to in Table VII as compound A. The other formula contained about 18 percent diethylamine and was prepared by mixing 2.5 pounds of the heavy amine-acid complex, 1.3 pounds of diethylamine, 2.55 pounds of kerosene and 0.8 pound of an emulsifier prepared by reacting nonylphenol bottoms with three times its weight of ethylene oxide. This formula will be referred to in Table VII as compound B. Thus, the diethylamine concentration of 2,000 p.p.m. reported in Table VII has associated with it twice as much of the complex when compound A is used as when compound B is employed.

TABLE VII

| Parts Per Million in Treating Water | | Results |
|---|---|---|
| DEA [1] | $H_2S$ | |
| 1,000 (from Compound A) | 680 | Some protection. |
| 2,000 (from Compound A) | 680 | Fair protection. |
| 3,000 (from Compound A) | 680 | Good protection. |
| 4,000 (from Compound A) | 680 | Excellent protection. |
| 1,500 (from Compound B) | 680 | Fair protection. |
| 2,000 (from Compound B) | 680 | Good protection. |

[1] DEA is diethylamine.

A comparison of data in Tables VI and VII shows that 2000 p.p.m. diethylamine in water evaporates to different degrees, depending on the amount of heavy amine-fatty acid complex present. With no complex present (Table VI), enough diethylamine evaporates to give excellent protection of metals exposed to the vapors. With an intermediate amount of complex present (compound B, Table VII), less amine is present in the vapors, but still enough to provide good protection. When a large amount of complex is present, however (compound A, Table VII), only enough amine evaporates to give fair protection. Even with the larger amount of complex present, however, the presence of 4000 p.p.m. of diethylamine in the liquid water resulted in evaporation of sufficient amine to produce excellent protection of metal surfaces exposed to the vapors. Since 4000 p.p.m. is 0.4 percent, and since the water-dispersible complex may contain as little as 10 percent of the light amine, it will be apparent that the complex should be diluted by only 20 to 25 times its volume of water when it is injected into a well containing a high concentration of hydrogen sulfide if the best protection of metal parts exposed to vapors is to be obtained. For wells containing less hydrogen sulfide, the dilution can be much greater.

Example IX

The data in Examples VII and VIII demonstrate the difficulty of predicting the amount of light amines, or their combinations with heavy amine-fatty acid complexes, required in any particular case. Therefore, a series of tests was run to determine the actual concentration of amine in the vapors in cases where good protection of metal surfaces occurred and also the concentration where good protection was not obtained. In this series of tests, two five-gallon bottles were connected so gas could be circulated between them by means of a pump. Two liters of 5 percent sodium chloride brine containing known amounts of diethylamine and hydrogen sulfide were poured into one bottle. The gas was then recirculated for 17 hours to establish liquid-vapor equilibrium. The bottle containing only gas was then disconnected, 100 ml. of water were added, and the bottle was vigorously shaken and allowed to stand one hour to absorb amine. This water was then analyzed for amine content by the test described above under the heading "Simple Inhibiting Composition." A calibration curve was prepared on color intensity to permit approximate quantitative analysis. The results are presented in Table VIII.

TABLE VIII

| Parts Per Million in Treating Water | | Milligrams of DEA per cubic foot of Gas |
|---|---|---|
| DEA | $H_2S$ | |
| 500 | Saturated (1,800 p.p.m.) | None |
| 2,000 | Saturated | None |
| 2,000 | 1,250 | 17 |
| 2,000 | 500 | [1] 40 |
| 2,000 (from Compound A) [2] | 680 | None |
| 2,000 (from Compound B) [2] | 680 | 15 |

[1] Probably high because of condensate in test bottle.
[2] Compounds A and B are the same as described in Example VIII.

A comparison of these results with the corrosion inhibiting results in Tables VI and VII shows that good or excellent protection is provided by the presence of 10 or more milligrams of diethylamine in the vapors. Of particular significance is the fact that 2000 p.p.m. of diethylamine in the presence of the complex in compound A did not produce an amount of amine in the gas which was detectable by this test. Nevertheless, Table VII shows that sufficient amine was present in the vapors to give fair protection to metal surfaces exposed to the vapors.

It follows, therefore, that if a detectable amount of light amine is present in the gases, at least fair protection of metal exposed to the vapors is being provided. For good results at least about 10 milligrams of amine per cubic foot of gases should be maintained. For best results, the concentration should exceed about 20 milligrams per cubic foot. These values apply, of course, only to cases where the rate of water condensation is the same or higher than that present in the tests. For lower rates of water condensation, much lower concentrations in the vapors will establish and maintain corrosion-inhibiting concentrations of light amine in the water. It should also be noted that the rate of evaporation of the amine from dilute solutions in water is very slow, particularly if acidic materials such as hydrogen sulfide and carbon dioxide are present. Therefore, once an inhibiting concentration of 100 p.p.m. or more of the amine has been established in condensed water, it will be unnecessary to maintain a continuous concentration of light amine in the vapors. Intermittent addition of amine has been found to be perfectly adequate to compensate for slight losses of amine due to evaporation and also to compensate for dilution of the amine concentration due to continued condensation of water on the metal surfaces.

*Example X*

To determine the suitability of oil solutions of light amines for use in wells, solutions of diethylamine in kerosene, containing one quart of amine per gallon of solution, were introduced into the annular space between the tubing and casing of a pumping well in the North Cowden Field of Texas. The well as producing about 115,000 cubic feet of gas per day from the well annulus. The rate of injection of the inhibitor solution and concentration of amine in the gas are shown in Table IX. Analysis for amine content of the gas was made by bubbling a measured amount of gas through a dilute acetic acid solution to absorb the amine and analyzing the water solution for amine content. Flushing was accomplished by returning the well production for the noted time to the well annulus.

tom of the well before the amine can evaporate. It will also be apparent from the data, however, that some flush is needed to avoid loss of all the amine near the top of the well. See, for example, the low concentration of amine in the gas one day after introducing 2 gallons of the inhibitor solution without flushing.

From the above description and examples, it will be apparent that we have accomplished the objects of our invention. Inhibitor compositions have been provided which protect both metal surfaces exposed to corrosive vapors containing hydrogen sulfide and water and metals exposed to liquids containing water and hydrogen sulfide. Compatible combinations of light amines with highly effective complexes of heavy amines and fatty acids have also been provided in both oil-soluble and water-dispersible form in which the light amine improves the properties of the complex and the complex controls the rate of evaporation of the light amine.

We claim:

1. A method of inhibiting corrosion of ferrous metals exposed to liquid water containing hydrogen sulfide comprising establishing in said water a concentration of at least about 50 parts per million by weight of a free aliphatic monoamine containing from 1 to 6 carbon atoms per molecule, said monoamine being present in an amount sufficient to combine with only a minor amount of the hydrogen sulfide in the fluids treated by the monoamine.

2. A method of inhibiting corrosion of ferrous metals exposed to liquid water containing hydrogen sulfide comprising establishing in said water a concentration of at least about 50 parts per million by weight of a free aliphatic monoamine selected from the group consisting of methylamine, dimethylamine, trimethylamine, ethylamine, diethylamine, triethylamine, propylamine, dipropylamine, isopropylamine, diisopropylamine, and 1-butylamine, said monoamine being present in an amount sufficient to combine with only a minor amount of the hydrogen sulfide in the fluids treated by the monoamine.

3. The method of claim 2 in which said amine is diethylamine.

TABLE IX

| Day | Time | Gallons Inhibitor Solution | Gas Sample Vol., Cu. Ft. at Csg. Pres. | Amine Content of Gas, Mg./Cu. Ft. | Remarks |
|---|---|---|---|---|---|
| 1 | 1:00 p.m. | None | .500 | None | Blank test of gas. |
|   | 2:30 p.m. | 2 | | | 2 min. flush, csg. flowline valve closed. |
| 2 | 9:00 a.m. | | .133 | None | 17 hrs. after treatment. Amine detected in liquid production. |
|   | 10:00 a.m. | 2 | | | 2 min. flush, csg. flowline valve closed. |
|   | 2:30 p.m. | | .133 | 30 | 4½ hrs. after treatment. |
| 3 | 9:00 a.m. | | .133 | 7.5 | One day after treatment. |
|   | 10:00 a.m. | 2 | | | No flush, csg. flowline valve open. |
| 4 | 9:00 a.m. | | .133 | Trace | One day after treatment. |
|   | 10:00 a.m. | 2 | | | 2 min. flush, csg. flowline valve closed. |
| 5 | 9:00 a.m. | | .133 | 7.5 | One day after treatment. |
|   | 10:00 a.m. | 2 | | | 2 min. flush, csg. flowline valve closed. |
| 6 | 9:00 a.m. | | .250 | 20 | One day after treatment. |
| 7 | 9:00 a.m. | | .300 | Trace | Two days after treatment. |

These results show that concentrations of amine capable of providing good protection were maintained in the gases over a period of a day following injection of 2 gallons of the 25 percent solution of amine in kerosene. Detactable traces of amine were present in the gas even after two days. This is in spite of the flow of about 115,000 cubic feet of gas per day out of the well through the annulus. Since amine was detected in liquids produced from the well, protection was being provided to the bottom of the 4000 foot well. It will be apparent that the amount of flushing should be limited to avoid washing too much of the amine down into the liquids at the bottom 4. A method for inhibiting in a well corrosion of ferrous metals exposed to water condensing from vapors containing hydrogen sulfide and water vapors as well as corrosion of ferrous metals exposed to liquid water containing hydrogen sulfide in the bottom of the well comprising introducing into said well a free aliphatic monoamine selected from the group consisting of methylamine, dimethylamine, trimethylamine, ethylamine, diethylamine, triethylamine, propylamine, dipropylamine, isopropylamine, diisopropylamine, and 1-butylamine, and flushing said amine down the well with sufficient liquid to carry a corrosion-inhibiting amount of said amine to the bottom of the well, said monoamine being present in an amount sufficient to combine with only a minor amount of the hydrogen sulfide in the fluids treated by the monoamine.

5. The method of claim 4 in which said amine is diethylamine.

6. An improved composition for inhibiting corrosion of ferrous metals exposed to water condensing from vapors containing hydrogen sulfide and water vapors, as well as corrosion of ferrous metals normally exposed to liquid water containing hydrogen sulfide comprising a combination of from about 10 to 80 percent by weight of a free low-boiling aliphatic monoamine containing from 1 to 6 carbon atoms per molecule and from about 20 to 90 percent of a salt of a high-boiling aliphatic amine and a carboxylic acid, said high-boiling amine containing at least 10 carbon atoms per molecule and said acid containing at least 6 carbon atoms per molecule, and said salt consisting of from ½ to 2 times the amount of high-boiling amine necessary to neutralize said carboxylic acid.

7. The composition of claim 6 in which said low-boiling amine is selected from the group consisting of methylamine, dimethylamine, trimethylamine, ethylamine, diethylamine, triethylamine, propylamine, dipropylamine, isopropylamine, diisopropylamine, and 1-butylamine, said high-boiling amine has the formula $RNHR'NH_2$ wherein R is an aliphatic hydrocarbon radical containing from about 10 to 20 carbon atoms and R' is a hydrocarbon radical containing from 2 to 4 carbon atoms, and said carboxylic acid is derived from a normally liquid fraction of petroleum by liquid phase partial oxidation of the latter.

8. The composition of claim 6 in which said low-boiling amine is selected from the group consisting of methylamine, dimethylamine, trimethylamine, ethylamine, diethylamine, triethylamine, propylamine, dipropylamine, isopropylamine, diisopropylamine, and 1-butylamine, said high-boiling amine has the formula $RNHR'NH_2$ wherein R is an aliphatic hydrocarbon radical containing from about 10 to 20 carbon atoms and R' is a hydrocarbon radical containing from 2 to 4 carbon atoms, and said carboxylic acid is the residue produced by distilling at about 270° C. under about 4 millimeters of mercury pressure the by-product acids obtained in the preparation of sebacic acid by fusing castor oil with alkali.

9. A method for inhibiting in a well corrosion of ferrous metals exposed to water condensing from vapors containing hydrogen sulfide and water vapors as well as corrosion of ferrous metals exposed to liquid water containing hydrogen sulfide in the bottom of the well comprising introducing into said well a combination of from about 10 to 80 percent by weight of a free low-boiling aliphatic monoamine containing from 1 to 6 carbon atoms per molecule and from about 20 to 90 percent of a salt of a high-boiling aliphatic amine and a carboxylic acid, said high-boiling amine containing at least 10 carbon atoms per molecule and said acid containing at least 6 carbon atoms per molecule, and said salt consisting of from ½ to 2 times the amount of high-boiling amine necessary to neutralize said carboxylic acid.

10. A water-dispersible, oil-soluble composition for inhibiting corrosion of ferrous metals exposed to water condensing from vapors containing hydrogen sulfide and water vapors, as well as corrosion of ferrous metals normally exposed to liquid water containing hydrogen sulfide comprising a combination of from about 10 to 30 percent by weight of a free low-boiling aliphatic monoamine, containing from 1 to 6 carbon atoms per molecule, from about 10 to 75 percent of a salt of a high-boiling aliphatic amine and a carboxylic acid, from about 5 to 30 percent of a dispersing agent, from 0 to about 75 percent of an oil, from 0 to about 10 percent of a mutual solvent for oil and water, and from 0 to about 10 percent of water, said high-boiling amine containing at least 10 carbon atoms per molecule and said acid containing at least 6 carbon atoms per molecule and said dispersing agent being an ester-free ether having the formula HOW wherein H is a hydrocarbon radical containing from about 12 to 20 carbon atoms and W is a polyglycol radical containing from about 20 to 40 oxyethylene groups, and said salt consisting of from ½ to 2 times the amount of high-boiling amine necessary to neutralize said carboxylic acid.

11. The composition of claim 10 in which said low-boiling amine is selected from the group consisting of methylamine, dimethylamine trimethylamine, ethylamine, diethylamine, triethylamine, propylamine, dipropylamine, isopropylamine, diisopropylamine, and 1-butylamine, said high-boiling amine has the formula $RNHR'NH_2$ wherein R is an aliphatic hydrocarbon radical containing from about 10 to 20 carbon atoms and R' is a hydrocarbon radical containing from 2 to 4 carbon atoms, and said carboxylic acid is derived from a normally liquid fraction of petroleum by liquid phase partial oxidation of the latter, said dispersing agent is an ester-free ether having the formula H'OW wherein H' is an alkylated aromatic hydrocarbon radical containing from about 12 to 20 carbon atoms attached to the oxygen linkage through the aromatic group, and W is a polyglycol radical containing from about 20 to 40 oxyethylene groups, said oil is a liquid petroleum fraction, and said mutual solvent is an alcohol selected from the group consisting of methyl alcohol, ethyl alcohol and isopropyl alcohol.

12. The composition of claim 10 in which said low-boiling amine is selected from the group consisting of methylamine, dimethylamine, trimethylamine, ethylamine, diethylamine, triethylamine, propylamine, dipropylamine, isopropylamine, diisopropylamine, and 1-butylamine, said high-boiling amine has the formula $RNHR'NH_2$ wherein R is an aliphatic hydrocarbon radical containing from about 10 to 20 carbon atoms and R' is a hydrocarbon radical containing from 2 to 4 carbon atoms, said carboxylic acid being the residue produced by distilling at about 270° C. under about 4 millimeters of mercury pressure the by-product acids obtained in the preparation of sebacic acid by fusing castor oil with alkali, said dispersing agent is an ester-free ether having the formula H'OW wherein H' is an alkylated aromatic hydrocarbon radical containing from about 12 to 20 carbon atoms attached to the oxygen linkage through the aromatic group, and W is a polyglycol radical containing from about 20 to 40 oxyethylene groups, said oil is a liquid petroleum fraction, and said mutual solvent is an alcohol selected from the group consisting of methyl alcohol, ethyl alcohol and isopropyl alcohol.

13. A method for inhibiting in a well corrosion of ferrous metals exposed to water condensing from vapors containing hydrogen sulfide and water vapors as well as corrosions of ferrous metals exposed to liquid water containing hydrogen sulfide in the bottom of the well comprising introducing into said well a combination of from about 10 to 30 percent by weight of a free low-boiling aliphatic monoamine containing from 1 to 6 carbon atoms per molecule, from about 10 to 75 percent of a salt of a high-boiling aliphatic amine and a carboxylic acid, from about 5 to 30 percent of a disperesing agent, from 0 to about 75 percent of an oil, from 0 to about 10 percent of a mutual solvent for oil and water, and from 0 to about 10 percent of water, said high-boiling amine containing at least 10 carbon atoms per molecule and said acid containing at least 6 carbon atoms per molecule and said dispersing agent is an ester-free ether having the formula HOW wherein H is a hydrocarbon radical containing from about 12 to 20 carbon atoms and W is a polyglycol radical containing from about 20 to 40 oxyethylene groups, and said salt consisting of from ½ to 2 times the amount of high-boiling amine necessary to neutralize said carboxylic acid.

(References on following page)

References Cited in the file of this patent

UNITED STATES PATENTS

| | | |
|---|---|---|
| 1,854,898 | Gill et al. | Apr. 19, 1932 |
| 2,053,024 | Dreyfus | Sept. 1, 1936 |
| 2,460,259 | Kahler | Jan. 25, 1949 |
| 2,607,744 | Viles | Aug. 19, 1952 |
| 2,649,415 | Sundberg et al. | Aug. 18, 1953 |
| 2,688,368 | Rodgers et al. | Sept. 7, 1954 |
| 2,736,658 | Pfohl et al. | Feb. 28, 1956 |
| 2,756,211 | Jones | July 24, 1957 |

OTHER REFERENCES

Mann et al.: Organic Inhibitors of Corrosion, article in Ind. and Eng. Chem., vol. 28, pages 159 to 163, February 1936.